Oct. 6, 1931.  R. T. ROMINE  1,825,923
INDUSTRIAL TRUCK
Filed Feb. 2, 1929  4 Sheets-Sheet 1

Inventor:
Robert T. Romine
By Macleod, Calver, Copeland & Dike
\& Attorneys.

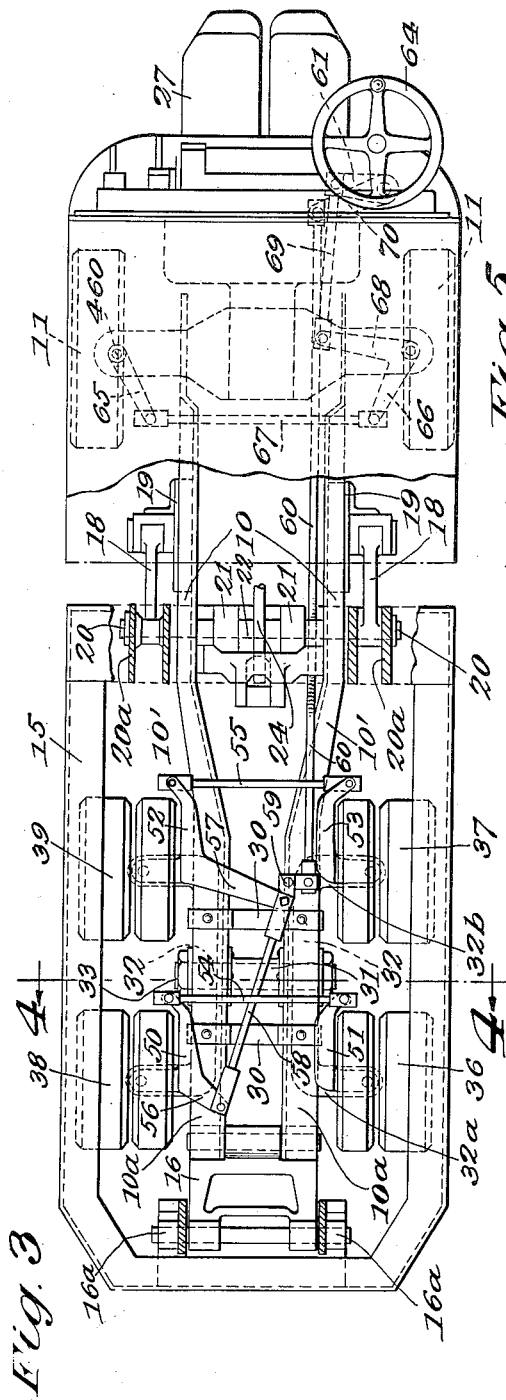

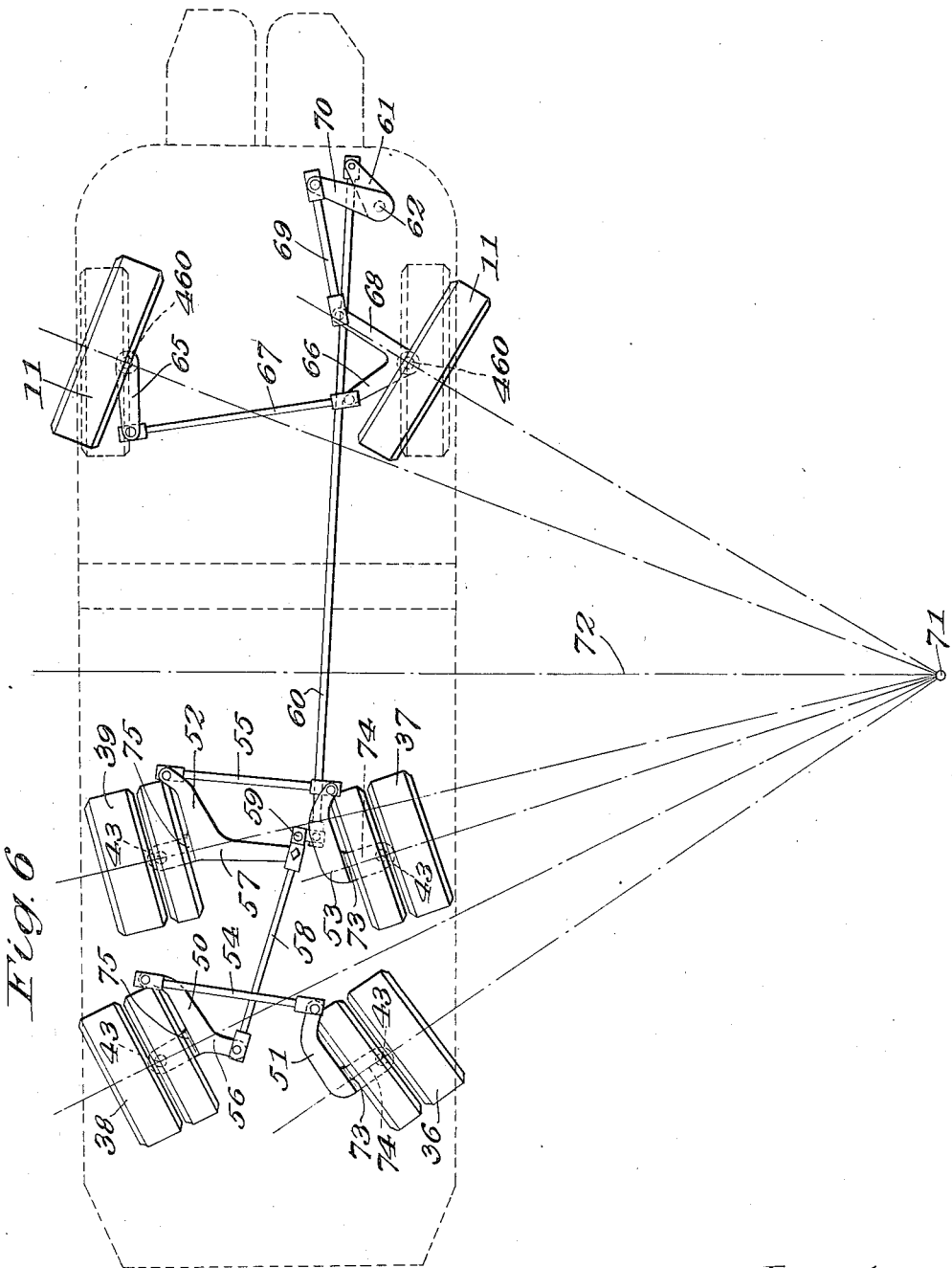

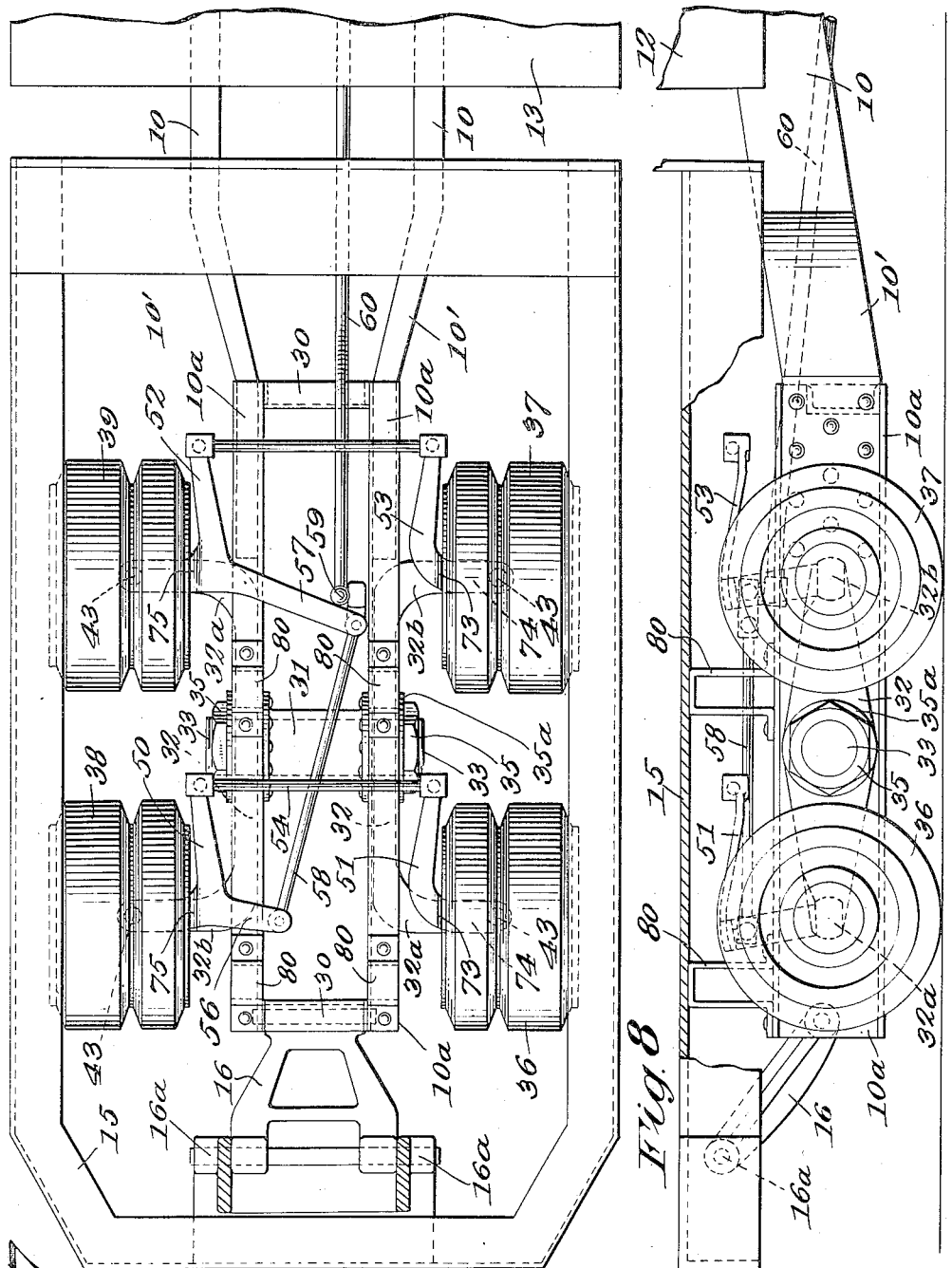

Patented Oct. 6, 1931

1,825,923

UNITED STATES PATENT OFFICE

ROBERT T. ROMINE, OF MOUNT CLEMENS, MICHIGAN

INDUSTRIAL TRUCK

Application filed February 2, 1929. Serial No. 337,062.

This invention relates to power driven industrial trucks of the type characterized not only by its relatively low platform, such as a lift platform, but by the concentration of the greater portion of the load on relatively small wide tread load wheels disposed beneath the platform. In this type of truck these load wheels are dirigible for enabling short turning of the truck in freight cars, in factory yards, or in aisle corners in plants. Moreover, trucks of this type are characterized by the arrangement of the main part of the frame in the rear of the platform, which is supported usually by larger dirigible driving wheels and which part of the frame commonly carries the motor and battery, the operator having a platform to stand on at the rear of the battery housing where he is within reach of the various controls. This kind of truck is of a distinct type in the art, and is usually provided with an elevating or lift platform, with mechanism for lifting the platform either a few inches or to a substantial height above the load supporting frame extension, and with a separate electric motor for operating the platform lifting mechanism.

The present invention embodies certain improvements in this type of truck such as shown in my earlier Patent 1,709,741 wherein a number of vertically articulating load wheels are mounted beneath the lift platform. Great difficulties were encountered in building trucks with load wheel mountings of this kind owing to small fixed clearances which had to be retained. The present invention provides another solution for many of the difficult problems incident to the practical building of such trucks.
An object of the invention is to provide an improved truck of the foregoing type in which the longitudinally spaced small load wheels, situated beneath the low platform, are supported for vertical articulation in an improved manner, whereby greater efficiency in operation and ease in manipulation, and greater economy and simplicity in construction are permitted by virtue of the invention.

Other objects of this invention will appear in the following description and appended claims, reference being had to the accompanying drawings forming a part of this specification, wherein like reference characters designate corresponding parts in the several views.

Fig. 3 is a fragmentary horizontal plan view of the truck.

Fig. 4 is a transverse section taken substantially on line 4—4 of Fig. 3.

Fig. 5 is a detail sectional view illustrating a wheel mounting.

Fig. 6 is a diagrammatical plan view showing the steering mechanism for the several wheels of the truck.

Fig. 7 is a fragmentary plan view of the forward end of the truck showing a somewhat modified form of construction.

Fig. 8 is a side elevation, partly in section, of the construction shown in Fig. 7.

Figure 1:
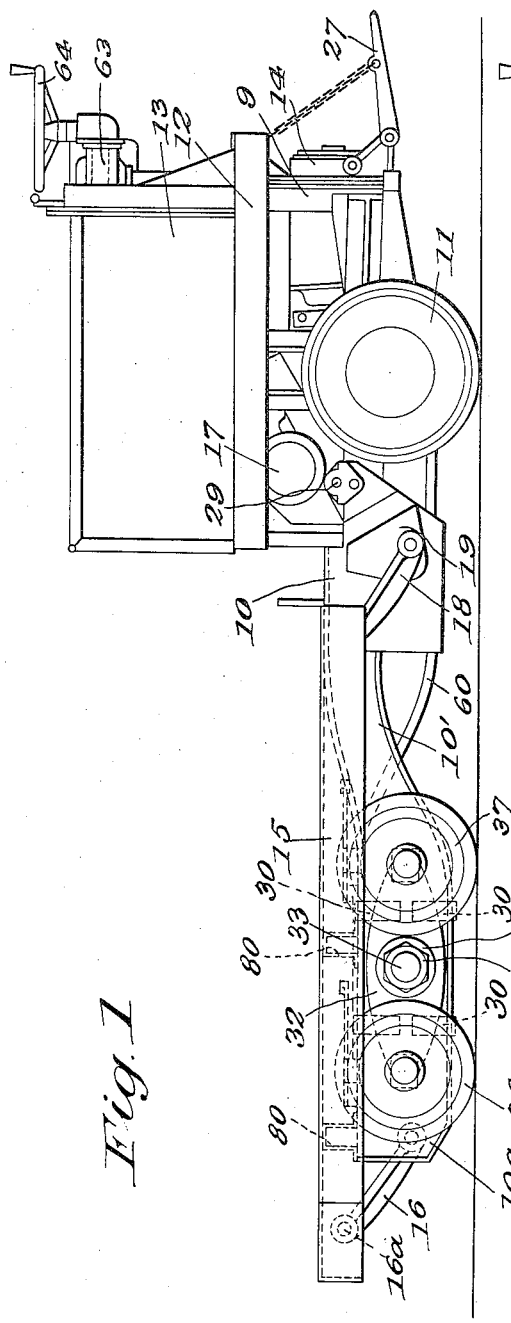
Fig. 1 is a side elevation illustrating a truck embodying my invention.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

In the drawings I have illustrated a power driven truck of the lift or elevating platform type embodying the invention, this truck comprising a relatively low chassis or main frame 9. The rear end of this main frame preferably supports the various operating mechanisms including battery and motors, and the frame has a forward extension 10 in the form of spaced parallel sills preferably composed of structural steel bars which form the load supporting frame portion disposed relatively close to the ground. In standard lift trucks of this type having load capacities ranging from two to five tons the usual height of the load supporting frame portion from the ground is from ten to twelve inches, and in ten ton capacity trucks this height is usually increased to about seventeen inches to take care of the larger diameter wheels required by such loads. The truck is provided at its rear end with a pair of driving wheels 11 mounted on the chassis and supporting the rear main portion of the frame. Extending upwardly from the rear end of the chassis 9 is a suitable frame structure 12 forming a platform support for a housing or casing 13 within which are carried the batteries for the electric motor or motors. In the present instance a motor 14 is supported beneath the battery housing 13 and is connected by suitable mechanism to the driving wheels 11 for the purpose of driving the same.

Figure 2:
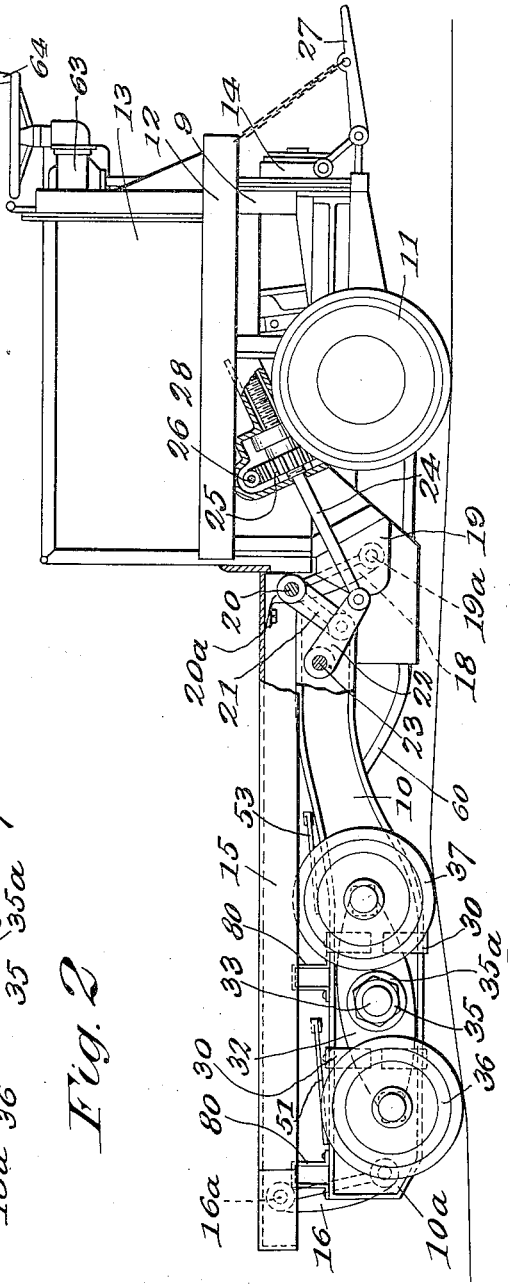
Fig. 2 is a similar view showing a lift platform raised, parts being broken away to illustrate parts of the mechanism.

A load elevating platform 15 extends forwardly from the frame structure 12 and surmounts the forward frame extension 10. This platform is pivotally attached to the frame extension at its forward end by means of a link frame 16, such as by pins and brackets indicated at 16a, Figs. 3 and 7. The rear end of the load elevating platform 15 is in the present instance connected to the frame as well as to a motor 17 by means of a toggle mechanism. As shown in Figs. 2 and 3 this toggle mechanism in the present instance may comprise a pair of links 18 attached at their lower ends to plates 19 by means of pivot pins 19a. The plates 19 are attached to the side bars of the chassis 10 and depend therefrom. The upper ends of the links 18 are pivotally connected to the elevating platform 15 by means of a transverse bar 20 which is secured to suitable brackets 20a depending from the underside of the platform. Located intermediate the chassis sills is a second link frame 21 connected at its upper end by means of the pivot bar 20 to the platform, and at its lower end pivoted to a link frame 22 intermediate the ends of the latter. The link frame 22 is pivoted at one end thereof to the chassis side bars by a transverse bar 23, and at its opposite end is pivotally attached to a threaded rod or ram 24.

Mounted on the ram 24 is a worm gear 25, the hub of which comprises a nut engaging the threads formed on the ram or shaft 24. The worm gear 25 is driven by a worm 26 and the latter is mounted on the shaft of the electric motor 17. This motor is electrically connected to the battery within the housing 13 and is controlled by a suitable mechanism at the rear of the battery housing and within easy reach of the operator who stands on the pivoted platform 27.

When the rod or ram 24 is retracted or drawn upwardly to operate the toggle mechanism, the elevating platform 15 is raised from the position shown in Fig. 1 to the position shown in Fig. 2, and hence the ram 24 will have a swinging movement. The motor 17, worm gear 25, etc. are accordingly mounted in a casing 28 which may be pivotally mounted at 29 (see Fig. 1) to permit the ram 24 to swing.

As illustrated in Figs. 1 to 3 inclusive the load supporting frame portion 10 preferably comprises a pair of spaced parallel sills which as they extend forwardly converge or taper inwardly as shown in Fig. 3 and at the same time are offset downwardly at 10′, as shown in Figs 1 and 2. This offset may be produced in various ways, and in the present instance as later described has the advantage of providing a space above the forward frame extension for certain parts of the steering mechanism. These sills are preferably formed from structural channel bars, and it will be seen that the forward portions 10a of the sills extend relatively close together and in parallelism. If desired, in smaller capacity trucks, these sills may be united or formed in a single piece. Referring more particularly to Fig. 4 it will be seen that the sill extensions 10a in advance of the offsets and converging portions 10′ each preferably comprises a vertical web 10b having upper and lower outwardly extending horizontal flanges 10c and 10d. The sills 10a are secured together and rigidly braced by means of transverse tie members 30 riveted thereto.

At each outer side of the frame extension 10a, and between each pair of flanges 10c and 10d is pivotally mounted a sub-frame member 32. A pair of sub-frame members are thus provided, one at each side of the load supporting frame extension, and as later described these are mounted to rock independently between the flanges 10c and 10d of the channel bars. Each sub-frame member 32 in the present instance comprises a forging having its maximum width at its middle and tapering toward opposite ends, as shown in Figs. 1 and 2. This bar 32 is also U-shaped, as shown in Fig. 3, it being forged to provide outwardly projecting parallel wheel supporting members 32a and 32b, herein termed axle portions. Extending through alined holes in the vertical webs 10b of the sill extensions is a shaft 33. This shaft is housed in and supported by a tubular housing 31 having annular flanges at opposite ends riveted to the channel webs 10b. Each rocker bar 32 is provided centrally thereof with a hole through which freely or loosely extends one end of the fixed shaft 33, suitable roller bearings 34 being interposed between the bar 32 and the turned down end of the shaft 33. The rocking bars or sub-frame members 32 are held in position on the ends of the shaft as by means of nuts 35 screwed on to the threaded ends of the shaft 33. Friction washers 35a are located on the shaft at opposite faces of the rocker bars. From this construction it will be seen that each sub-frame member 32 is mounted to rock freely on an end of the shaft 33, and each is adapted to rock independently of the other. A single shaft or bar 33 for supporting these sub-frame members, instead of two, is provided for the purposes of greater economy and strength.

Mounted beneath the load elevating platform 15 are a number of load carrying wheels of relatively small diameter and each having a relatively wide bearing surface or tread. Each rocking sub-frame member 32 carries at opposite ends a pair of load wheels, these being mounted on knuckles carried by the projecting axle portions 32a and 32b of each of the sub-frame bars. In the present instance, four dual load carrying wheels are mounted beneath the platform, these being mounted as separate longitudinally spaced pairs 36, 37, 38 and 39 at opposite sides of the frame. As illustrated in Fig. 5 each dual wheel may comprise a drum 40 carrying a pair of independently revoluble tire treads 41 and 42, although a single tread may be employed where desired in accordance with the load to be carried and the width of the tread required.

Each load wheel 36, 37, 38 and 39 is mounted on a knuckle carried at the end of one of the axle portions 32a or 32b. As shown in Fig. 5 the outer end of this axle portion may be tapped to provide a vertical hole through which is threaded a pin 43. This pin is rigidly fixed within the tapped hole in the split end of the part 32a or 32b by means of a bolt or nut 44 which clamps the split end portions of the part 32a together on to the pin 43. The pin 43 rests upon a ball bearing 45 supported by a knuckle sleeve 46, the latter being free to turn about the axis of the pin 43. The drum 40 is provided with a central hub mounted on the knuckle, and between the axle portion 46a of the knuckle and this hub are interposed suitable tapered roller bearings 47. These parts may all be held in position by means of a nut 48. To the outer face of the hub is secured by means of suitable screws a cap 49. To the knuckle 46 of each of the load carrying wheels is secured above the end of the axle portion 32a or 32b one of the steering arms hereinafter described. From this construction it will be seen that each load wheel structure may be turned while steering the truck about the fixed vertical axis of the pin 43, and each wheel is free to revolve on the projecting axle portion 46a of the knuckle. Moreover, although each sub-frame bar 32 is preferably housed between the flanges 10c and 10d of the frame sill so as to have a limited rocking movement therebetween, the sub-frame 32 is provided with the axle extensions which enable the load wheels to be supported at a sufficient distance from the frame sills to permit the load wheels to be turned, as in the manner shown in Fig. 6. It will also be noted that each knuckle with the steering arm is located or projects interiorly of the drum 40, so that the axis of turning 43 is situated preferably close to the central vertical axis of the drum passing through the center of gravity thereof.

Mounted on the knuckles 46 is a steering arm 50 for the wheel 38 and a steering arm 51 for the wheel 36. A steering arm 52 is mounted on the knuckle for the wheel 39 and a steering arm 53 is correspondingly provided for the wheel 37. The steering arms 50 and 51 are flexibly connected by means of a transverse rod 54 and the steering arms 52 and 53 are flexibly connected by a transverse rod 55. The steering arm 50 is provided with an offset arm portion 56, and the steering arm 52 is provided with an offset arm portion 57, these offset portions being pivotally joined together by means of a connecting rod 58. The rod 58 is flexibly connected to a rearwardly extending rod 60 as by means of a ball joint 59. This rod terminates adjacent the rear or driving end of the truck and is suitably connected to an arm 61 mounted adjacent the lower end of a vertically extending steering post 62. The steering post 62 at its upper end is connected to a horizontally extending stud shaft 63 (see Fig. 1) and this shaft is operated through the medium of reduction gearing (not shown) by means of a steering wheel 64.

The rear driving wheels 11 are also mounted on steering knuckles 460 so as to turn relative to the chassis frame. Connected to the axle spindles of the driving wheels 11 are steering arms 65 and 66, which are flexibly connected together by means of a transverse rod or link 67. The arm 66 is provided with an offset arm portion 68 which is connected to the steering post 62 by means of a link 69 and an arm 70 which are flexibly connected together as shown in Fig. 6.

The steering arms of the load wheels and the driving wheels are constructed of varying lengths and so proportioned that the steering mechanism may be operated to cause all of the wheels to turn simultaneously about substantially a common turning center or locus (see Fig. 6). The turning center 71 at all times lies in a line 72 extending at right angles to the central longitudinal axis of the truck, and this locus line 72 extends intermediate the normal axes of the front or driving wheels 11 and the intermediate set of wheels 37 and 39, and as a result of this construction an extremely short turning radius may be obtained, as shown in Fig. 6.

The forward load supporting extension of the frame may be constructed as illustrated in Figs. 7 and 8. The bars or sills 10 adjacent the front of the upright frame 12 are depressed or offset downwardly as shown in Fig. 8, and these sills also converge inwardly at 10' as shown in Fig. 7. Riveted to the parallel free ends of the frame bars 10 are channels 10a. The construction of the truck is otherwise the same as that described above.

In order to support the platform 15 in predetermined position with respect to the load wheels, and to provide a space beneath the frame extension 10a and the platform when in its lowest position for the steering mechanism, platform stops 80 are mounted on the channels 10a. These stops may be in the form of flat bars bent into U-shape and riveted to the top flanges of the channels 10a. The platform 15 when in its lowest position will thus be supported in horizontal position by means of the stops or brackets 80. It will be seen that by depressing the forward part of the frame, beneath the platform, and providing the platform stops 80, a substantial space is provided beneath the platform to house the steering mechanism, which can thereby be located above the frame sills 10a, as shown especially in Figs. 4, 7 and 8. The steering arms 56 and 57 will extend as shown in Figs. 5 and 7 over one of the sills 10a, sufficient space being provided to permit the wheels to rock without causing the steering arms to strike the platform when the latter is down. The ends of the arms 51 and 53 are each bent downwardly at 73 and extended inwardly at 74 (see Figs. 5 and 6) so as to permit them to be connected to the knuckles 46 above the axle portions 32a or 32b. In like manner the steering arms 56 and 57 are offset at 75 so as to extend downwardly and inwardly into the interior of the wheel drum to permit connection to the knuckles of the wheels.

By locating the sub-frames entirely at the outer sides of the sills instead of beneath the sills, all of the space beneath the platform when lowered may be utilized for the steering parts, so that this restricted space is less crowded than heretofore. Moreover, by lowering or depressing the frame at the front end thereof the entire space above the frame extension may be used for housing the steering parts. Previously where the steering rods ran along beneath the sub-frame and load supporting frame extension, they were so close to the ground that frequently they were damaged by striking obstructions on the ground.

The carrier or sub-frame members 32 are mounted for the purpose of convenience so as to rock on a single shaft which is fixed in the frame sills, a ball or roller bearing race being interposed between the shaft and each carrier. Either set of wheels is mounted so as to rock relatively to the other set while giving a fixed range of lifting movement of the platform irrespective of the load. The independent mounting of each sub-frame enables the load wheels at one side of the frame to articulate independently of those at the opposite side. This construction enables the wheel 36 to rise or fall relatively to wheel 38, and wheel 37 to rise or fall relatively to wheel 39. This construction eliminates considerable strain on the forward part of the frame when encountering rough ground, inclines or railroad tracks in factory yards, and in addition reduces any tendency of the platform to tilt sidewise and spill the load. It will also be noted that the platform and frame extension are so constructed that the load wheels can articulate vertically with the two sub-frames in any position of the platform.

What I claim is:

1. An industrial power driven truck comprising a main frame having a low forwardly extending load supporting frame portion, formed of angle bars arranged to provide flanges extending laterally from the body of the frame, a platform surmounting said frame portion, a pair of sub-frame bars one at each outer side of said frame portion, in the vertical planes of said flanges, means carried by said frame portion for pivotally supporting said bars to rock independently of each other about a horizontal axis, and a pair of longitudinally spaced relatively small diameter dirigible load wheels mounted on each sub-frame member beneath said platform.

2. An industrial power driven truck comprising a main frame having a low load supporting frame extension, formed of angle bars arranged to have a flange extending outward from each side of the frame, power driven wheels supporting the rear end of said main frame, a platform surmounting said frame extension, a pair of separate sub-frame members independently pivoted to said frame extension on a common transverse axis in vertical alignment with said flanges on the frames, whereby each sub-frame member is adapted to rock vertically independently of the other, and a pair of longitudinally spaced relatively small load wheels mounted at opposite ends of each sub-frame member beneath said platform.

3. An industrial power driven truck comprising a main frame having a low load supporting frame extension, formed of angle bars arranged to have a flange extending laterally from each side of the frame, a platform surmounting said frame extension, a pair of sub-frame bars one at each outer side of said frame extension, in vertical alignment with said flanges on the frame, means carried by the frame extension for pivotally supporting said bars to rock independently of each other about a transverse horizontal axis, and a pair of longitudinally spaced relatively small dirigible load wheels mounted on each sub-frame bar beneath said platform.

4. In an industrial power driven truck, a frame comprising a main portion at one end and a load supporting frame extension disposed relatively close to the ground, and formed of angle bars arranged to provide a flange extending outwardly from each side of the frame, power driven wheels supporting said main portion, a platform surmounting said frame extension normally in a position closely adjacent the ground, a pair of longitudinally spaced load wheels at each outer side of said frame extension beneath the platform, a longitudinal bar in vertical alignment with each of said flanges on the frame and having outwardly projecting axle portions at opposite ends carrying each pair of load wheels, and means for pivotally connecting each bar to the frame to rock independently on a transverse horizontal axis.

5. In an industrial power driven truck, a frame comprising a main portion at one end and a load supporting frame portion having a downward offset to provide a frame extension the top of which is disposed relatively closer to the ground than the top of the main portion, power driven wheels supporting said main portion, a platform surmounting said load supporting frame portion normally in a position closely adjacent said frame portion in rear of said offset, a pair of longitudinally spaced load wheels at each outer side of said frame extension beneath the platform, a longitudinal bar having integral outwardly formed axle portions at opposite ends carrying each pair of load wheels, means pivotally connecting said bars to the frame to permit the bars to rock independently on a transverse horizontal axis, and means on the frame cooperating with said bars to limit vertical rocking movement thereof.

6. In an industrial power driven truck, a frame comprising a main portion at one end and a load supporting frame extension disposed relatively close to the ground and comprising a sill structure having outwardly extending flanges at opposite outer sides, subframe members mounted to rock on a transverse horizontal axis beneath said flanges, each member having at each end an outwardly projecting axle portion, a relatively small diameter load wheel mounted for steering movement on a vertical axis at the end of each axle portion and beneath said platform, said flanges forming stops to permit a fixed range of vertical movement of each load wheel relatively to the platform.

In testimony whereof I affix my signature.
ROBERT T. ROMINE.